(12) United States Patent
Shimojo

(10) Patent No.: US 11,332,021 B2
(45) Date of Patent: May 17, 2022

(54) ELECTRIC VEHICLE

(71) Applicant: SUBARU CORPORATION, Tokyo (JP)

(72) Inventor: Kazuma Shimojo, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 66 days.

(21) Appl. No.: 16/908,975

(22) Filed: Jun. 23, 2020

(65) Prior Publication Data

US 2021/0001731 A1 Jan. 7, 2021

(30) Foreign Application Priority Data

Jul. 3, 2019 (JP) .............................. JP2019-124208

(51) Int. Cl.
*B60L 15/20* (2006.01)
*B60W 10/111* (2012.01)

(52) U.S. Cl.
CPC ........ *B60L 15/2054* (2013.01); *B60W 10/111* (2013.01); *B60L 2240/427* (2013.01); *B60L 2240/486* (2013.01); *Y02T 10/72* (2013.01)

(58) Field of Classification Search
CPC ........... B60L 15/2054; B60L 2240/427; B60L 2240/486; B60L 2240/12; B60L 2240/421; B60L 2270/147; B60L 15/20; B60L 2240/14; B60W 10/111; Y02T 10/72; Y02T 10/64

See application file for complete search history.

(56) References Cited

U.S. PATENT DOCUMENTS

2018/0251036 A1* 9/2018 Tapadia .................. B60L 50/51
2021/0107362 A1* 4/2021 Osugi ..................... B60L 15/20

FOREIGN PATENT DOCUMENTS

| JP | 2005-117876 A | 4/2005 |
| JP | 2018191366 A * | 11/2018 |
| JP | 2019022415 A * | 2/2019 |

* cited by examiner

*Primary Examiner* — Justin Holmes
(74) *Attorney, Agent, or Firm* — McDermott Will & Emery LLP

(57) ABSTRACT

A vehicle control apparatus for an electric vehicle including a battery and a motor includes a traveling controller. The traveling controller drives the motor on the basis of a carrier frequency to control a driving force of the electric vehicle and to cause the electric vehicle to travel, and changes the carrier frequency on the basis of a speed ratio set through a shift operation performed by a driver of the electric vehicle.

2 Claims, 2 Drawing Sheets

| SHIFT STEP Ns | FIRST STEP | SECOND STEP | THIRD STEP | FOURTH STEP |
|---|---|---|---|---|
| CARRIER SYNCHRONIZATION NUMBER Nc | 60 | 48 | 36 | 24 |

ELECTRIC VEHICLE

CROSS-REFERENCE TO RELATED APPLICATIONS

The present application claims priority from Japanese Patent Application No. 2019-124208 filed on Jul. 3, 2019, the entire contents of which are hereby incorporated by reference.

BACKGROUND

The disclosure relates to a vehicle control apparatus that controls the operation of an electric vehicle.

A hybrid electric vehicle (HEV), which is a fuel-efficient vehicle including an engine and an electric motor as driving power sources, has been popularized. An electric vehicle (EV), which is an emission-free vehicle including only an electric motor as a driving power source, has also been popularized. Various types of control for electric vehicles including HEVs and EVs are disclosed in Japanese Unexamined Patent Application Publication No. 2005-117876, for example.

SUMMARY

An aspect of the technology provides a vehicle control apparatus for an electric vehicle including a battery and a motor. The vehicle control apparatus includes a traveling controller configured to drive the motor on the basis of a carrier frequency to control a driving force of the electric vehicle and to cause the electric vehicle to travel, and change the carrier frequency on the basis of a speed ratio set through a shift operation performed by a driver of the electric vehicle.

BRIEF DESCRIPTION OF THE DRAWINGS

The accompanying drawings are included to provide a further understanding of the technology and are incorporated in and constitute a part of this specification. The drawings illustrate exemplary embodiments and, together with the specification, serve to explain the principles of the technology.

DETAILED DESCRIPTION

An electric vehicle with an improved production value has been generally required.

It is desirable to provide a vehicle control apparatus that improves a production value of an electric vehicle.

Some example embodiments of the technology will now be described in detail with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments that are not recited in a most-generic independent claim of the technology are optional and may be provided on an as-needed basis. The drawings are schematic and are not intended to be drawn to scale. Throughout the present specification and the drawings, elements having substantially the same function and configuration are denoted with the same numerals to avoid any redundant description. Note that the description is given in the following order.

1. Example Embodiments (Example Process of Setting Carrier Frequency to Drive Electric Vehicle Motor)
2. Modification Examples

Example Embodiments

[Outline of Example Configuration]

Figure 1:
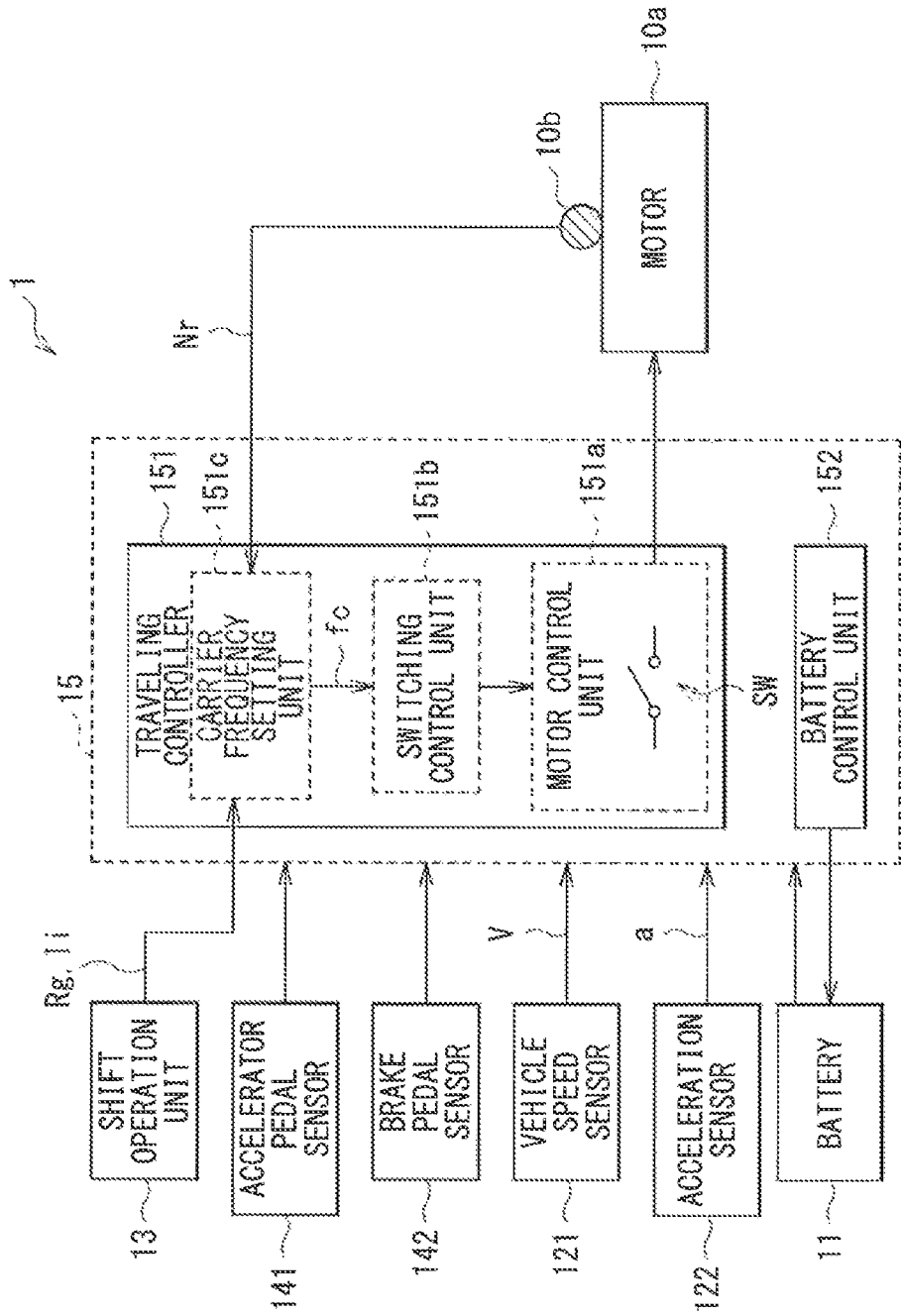
FIG. 1 is a block diagram schematically illustrating an example configuration of an electric vehicle that includes a vehicle control apparatus according to one example embodiment of the technology.

FIG. 1 is a block diagram schematically illustrating an example configuration of an electric vehicle 1 that includes a vehicle control apparatus 15 according to an example embodiment of the technology.

As illustrated in FIG. 1, the electric vehicle 1 may include a motor (e.g., an electric motor) 10a, a rotation angle sensor 10b, a battery 11, a vehicle speed sensor 121, an acceleration sensor 122, a shift operation unit 13, an accelerator pedal sensor 141, a brake pedal sensor 142, and a vehicle control apparatus 15.

[A. Motor 10a and Rotation Angle Sensor 10b]

The motor 10a may be a driving power source of the electric vehicle 1. The electric vehicle 1 may be an electric vehicle (EV) that includes the motor 10a as a driving power source.

The rotation angle sensor 10b may be attached to the motor 10a, for example. The rotation angle sensor 10b may detect a rotation angle $\theta m$ of the motor 10a and output the detected rotation angle $\theta m$ to the vehicle control apparatus 15. The rotation angle sensor 10b may be a resolver rotation angle sensor, for example.

The detected rotation angle $\theta m$ of the motor 10a may be converted by the vehicle control apparatus 15 into the revolution number Nr of the motor 10a, for example. As illustrated in FIG. 1, the data on the revolution number Nr measured in this way may be outputted to a carrier frequency setting unit 151c of a traveling controller 151 described below.

[B. Battery 11]

The battery 11 may store electric power to be used in the electric vehicle 1. For example, the battery 11 may be various kinds of secondary battery, such as a lithium-ion battery. The battery 11 may store the regenerative electric power received from, for example, the motor 10a as well as the electric power (charging power) received through charging from a device outside the electric vehicle 1.

[C. Vehicle Speed Sensor 121 and Acceleration Sensor 122]

The vehicle speed sensor 121 may detect a speed of the electric vehicle 1 (hereinafter referred to as a "vehicle speed V") while the electric vehicle 1 is traveling. The vehicle speed V detected by the vehicle speed sensor 121 may be outputted to the vehicle control apparatus 15 (e.g., the traveling controller 151 described in detail below), as illustrated in FIG. 1.

The acceleration sensor 122 may detect an acceleration rate "a" of the electric vehicle 1 while the vehicle 1 is traveling. The acceleration rate "a" detected by the acceleration sensor 122 may be outputted to the vehicle control apparatus 15 (e.g., the traveling controller 151 described in detail below), as illustrated in FIG. 1.

[D. Shift Operation Unit 13]

The driver of the electric vehicle 1 may perform shift operations using the shift operation unit 13. The shift operation unit 13 may include a shift lever, for example. Data generated on the basis of the shift operation performed using the shift operation unit 13 may be outputted to the traveling controller 151 (e.g., the carrier frequency setting unit 151c described in detail below) in the vehicle control apparatus 15, as illustrated in FIG. 1. Examples of the data may include the data on a shift step Ns (e.g., a first step, a second step, a third step . . . ), the data on a speed ratio Rg corresponding to the shift step Ns, and inhibitor data Ii (refer to FIG. 1). The inhibitor data Ii may indicate whether the setting mode of the speed ratio Rg has been set to a manual mode or an automatic mode. In other words, the inhibitor data Ii may indicate whether a so-called "M range" (i.e., the manual mode) has been set.

In one embodiment, the shift step Ns (or the speed ratio Rg) may serve as a "speed ratio set through a shift operation".

[E. Accelerator Pedal Sensor 141 and Brake Pedal Sensor 142]

The accelerator pedal sensor 141 may detect the quantity of a depressing operation of a non-illustrated accelerator pedal performed by the driver of the electric vehicle 1 (i.e., an accelerator position). The brake pedal sensor 142 may detect the quantity of a depressing operation of a non-illustrated brake pedal performed by the driver of the electric vehicle 1 (i.e., a brake stroke).

The accelerator position detected by the accelerator pedal sensor 141 and the brake stroke detected by the brake pedal sensor 142 may be outputted to the vehicle control apparatus 15 (e.g., the traveling controller 151 described in detail below), as illustrated in FIG. 1.

[F. Vehicle Control Apparatus 15]

The vehicle control apparatus 15 may control various operations of the electric vehicle 1 and conduct various calculations. For example, the vehicle control apparatus 15 may include a microprocessor that performs calculations, a read only memory (ROM) that stores data items including programs to cause the microprocessor to execute various processes, a random access memory (RAM) that stores various kinds of data items including the results of calculations, a backup RAM in which these data items are stored by a battery, for example, and an input interface (I/F).

In the example illustrated in FIG. 1, the vehicle control apparatus 15 may include the traveling controller 151 and a battery control unit 152.

In one embodiment, the vehicle control apparatus 15 may serve as a "vehicle control apparatus".

[F-1. Traveling Control Unit 151]

The traveling controller 151 may comprehensively control the traveling operation of the electric vehicle 1. In the example illustrated in FIG. 1, the traveling controller 151 may include a motor control unit 151a. The motor control unit 151a may drive the motor 10a to cause the electric vehicle 1 to travel and may control the driving force of the electric vehicle 1. In the example illustrated in FIG. 1, the traveling controller 151 may further include a switching control unit 151b and the carrier frequency setting unit 151c.

The motor control unit 151a may drive the motor 10a and control various operations. For example, the motor control unit 151a may be an inverter. In one example, the motor control unit 151a may control the driving operation of a drive wheel of the electric vehicle 1 caused by the motor 10a and the regenerative operation of the motor 10a. The inverter or the motor control unit 151a may include a plurality of switching devices SW. For example, the switching devices SW may include insulated gate bipolar transistors (IGBTs), as illustrated in FIG. 1.

The switching control unit 151b may perform on-off control to switch the switching devices SW in the inverter between an on-state and an off-state. For example, the switching control unit 151b may perform pulse width modulation (PWM) control as the on-off control of the switching devices SW in the inverter. The PWM control may be performed on the basis of a carrier frequency fc (refer to FIG. 1) received from the carrier frequency setting unit 151c described in detail below.

Various types of control may be performed during the on-off control of the switching devices SW. For example, voltage commands Vu, Vv, and Vw may be controlled so as to follow given current commands id and iq on the basis of a torque command. The torque command may be based on the accelerator position detected by the accelerator pedal sensor 141 and the brake stroke detected by the brake pedal sensor 142, for example. Thereafter, the voltage commands Vu, Vv, and Vw may be compared with a carrier wave (hereinafter referred to as a carrier frequency fc) to calculate or generate a gate command (control signal) for the on-off control of the switching devices in the inverter.

The carrier frequency setting unit 151c may set the carrier frequency fc defining a cycle of the PWM control. For example, as illustrated in FIG. 1, the carrier frequency setting unit 151c may set the carrier frequency fc on the basis of the shift step Ns (or the speed ratio Rg) and the inhibitor data Ii that are received from the shift operation unit 13, and the revolution number Nr of the motor 10a calculated from the rotation angle θm and outputted from the rotation angle sensor 10b.

In an example embodiment, the carrier frequency setting unit 151c changes the carrier frequency fc for the driving control of the motor 10a on the basis of the shift step Ns (or the speed ratio Rg) set through the shift operation performed by the driver of the electric vehicle 1. In this example embodiment, the carrier frequency setting unit 151c may change the carrier frequency fc on the basis of the revolution number Nr of the motor 10a as well as the shift step Ns (or the speed ratio Rg).

The process of setting the carrier frequency fc by the carrier frequency setting unit 151c is described in detail below with reference to FIGS. 2 and 3.

[F-2. Battery Control Unit 152]

The battery control unit 152 may conduct various types of control, including charging control, of the battery 11, as illustrated in FIG. 1.

[Operations, Workings, and Example Effects]

Some operations, workings, and example effects of the electric vehicle 1 according to an example embodiment of the technology will now be described.

[A. Vehicle Control Process According to Example Embodiment]

Example control processes, including the process of setting the carrier frequency fc described above, executed in the electric vehicle 1 will now be described in detail with reference to FIGS. 1 to 3.

[A-1. Electromagnetic Noise Generated by Motor 10a]

The motor (electric motor) 10a driven under the PWM control described above may generate an electromagnetic noise depending on the on-off frequency (i.e., the carrier frequency fc) of the switching devices SW in the motor control unit (inverter) 151a. For example, current ripples may be generated in the motor winding line of the motor 10a depending on the carrier frequency fc. The electromagnetic noise generated from the motor 10a may change depending on the carrier frequency fc.

[A-2. Details of Process of Setting Carrier Frequency fc]

In an example embodiment of the technology, the carrier frequency setting unit 151c of the traveling controller 151 in the vehicle control apparatus 15 of the electric vehicle 1 may perform a process of setting the carrier frequency fc as described below to change the electromagnetic noise generated from the motor 10a.

Figures 2, 3:
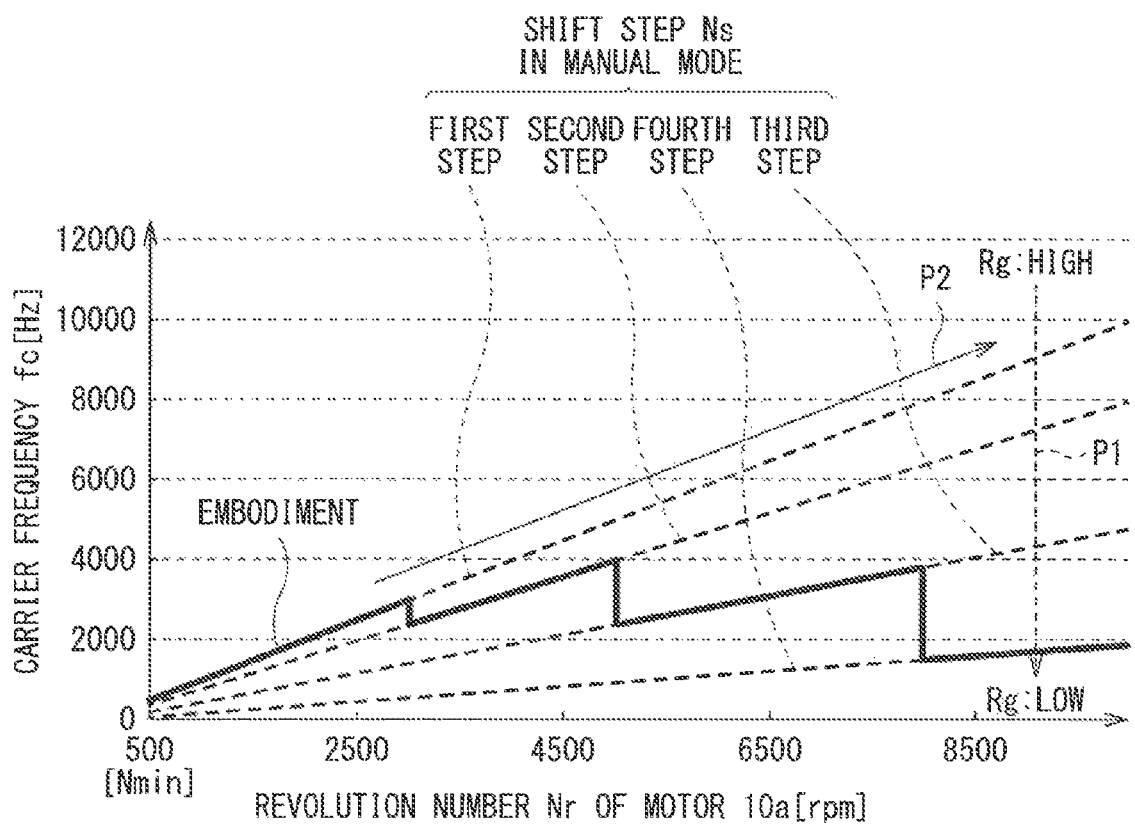
FIG. 2 is a table illustrating example carrier synchronization numbers according to one example embodiment of the technology.
FIG. 3 is a schematic diagram illustrating an example process of setting a carrier frequency.

FIG. 2 schematically illustrates an example carrier synchronization number table Tb used in the process of setting the carrier frequency fc according to an example embodiment. The carrier synchronization number table Tb may illustrate an example relation between the shift step Ns (or the speed ratio Rg) and the carrier synchronization number Nc. The carrier synchronization number Nc may be a parameter on the basis of which the carrier frequency fc is set. Note that, in the carrier synchronization number table Tb illustrated in FIG. 2, the carrier synchronization number Nc may gradually decrease as the shift step Ns increases.

FIG. 3 schematically illustrates an example process of setting the carrier frequency fc according to an example embodiment of the technology. FIG. 3 illustrates an example relation of the revolution number Nr of the motor 10a and the shift step Ns (or the speed ratio Rg) to the carrier frequency fc to be set. For example, in the example illustrated in FIG. 3, the shift step Ns may be switched from the first step to the second step when the revolution number Nr becomes equal to 3000 rpm, from the second step to the third step when the revolution number Nr becomes equal to 5000 rpm, and from the third step to the fourth step when the revolution number Nr becomes equal to 8000 rpm.

As described above, the carrier frequency setting unit 151c may change the carrier frequency fc on the basis of the shift step Ns (or the speed ratio Rg) set through the shift operation performed by the driver of the electric vehicle 1, as illustrated by an arrow P1 in FIG. 3. For example, in the example illustrated in FIG. 3, the carrier frequency setting unit 151c may decrease the carrier frequency fc as the speed ratio Rg decreases, that is, in accordance with an increase in the shift step Ns from the first step to the fourth step. In this way, the carrier frequency fc may be largely changed on the basis of the shift operation by the driver. This allows the motor 10a to present a variation in an electromagnetic noise depending on the shift operation, enhancing the driver's feeling of performing the shift operation.

In the example embodiment illustrated in FIG. 3, the carrier frequency setting unit 151c may change the carrier frequency fc on the basis of the speed ratio Rg only while the manual mode is being selected as the setting mode of the speed ratio Rg through the shift operation by the driver. The carrier frequency setting unit 151c may change the carrier frequency fc on the basis of the speed ratio Rg only when the inhibitor data Ii indicates that the manual mode or "M range" has been set. One reason for this is that, during the normal control, that is, while the mode other than the M range (i.e., the automatic mode) is being selected, the carrier frequency fc may be appropriately set in consideration of the system efficiency or other factors relevant to the electric vehicle 1 rather than the shift operation performed by the driver.

As described above, the carrier frequency setting unit 151c may change the carrier frequency fc on the basis of the revolution number Nr of the motor 10a as well as the speed ratio Rg (or the shift step Ns), as illustrated by an arrow P2 in FIG. 3. For example, in the example illustrated in FIG. 3, the carrier frequency setting unit 151c may increase the carrier frequency fc (e.g., in a linear fashion as illustrated in FIG. 3) as the revolution number of the motor 10a increases. As described above, the carrier frequency fc may be changed (increased or decreased) on the basis of the change (increase or decrease) of the revolution number Nr of the motor 10a when the shift step Ns (or the speed ratio Rg) is fixed by the shift operation by the driver. This allows the motor 10a to present a variation in an electromagnetic noise depending on the shift operation.

In an example embodiment, the carrier frequency setting unit 151c may change the carrier frequency fc on the basis of the revolution number Nr of the motor 10a only when the revolution number Nr is equal to or greater than a predetermined minimum threshold Nmin. For example, in the example illustrated in FIG. 3, the carrier frequency setting unit 151c may change the carrier frequency fc on the basis of the revolution number Nr only when the revolution number Nr of the motor 10a is equal to or greater than 500 rpm (Nr≥500 [rpm]). One reason for this is that a significantly low revolution number Nr (e.g., the revolution number Nr less than the predetermined minimum threshold Nmin (Nr<Nmin)) can hinder the synchronous PWM control from being executed, resulting in a decrease in controllability. In the case of a significantly low revolution number Nr, asynchronous PWM control may be executed instead.

[B. Workings and Example Effects]

As described above, the carrier frequency setting unit 151c of the traveling controller 151 in the electric vehicle 1 according to an example embodiment of the technology changes the carrier frequency fc for the driving control of the motor 10a on the basis of the speed ratio Rg (or the shift step Ns) set through the shift operation performed by the driver of the electric vehicle 1. This allows the electric vehicle 1 including the motor 10a as a driving power source to present a variation in an electromagnetic noise depending on the shift operation performed by the driver, enhancing the driver's feeling of performing the shift operation. Therefore, according to at least one example embodiment of the technology, it is possible to improve the production value of the electric vehicle 1.

In some example embodiments of the technology, the traveling controller 151 may change the carrier frequency fc on the basis of the revolution number Nr of the motor 10a as well as the speed ratio Rg (or the shift step Ns). This allows the motor 10a to present a variation in an electromagnetic noise depending on not only the shift operation performed by the driver but also the revolution number Nr of the motor 10a. Therefore, according to some example embodiment of the technology, it is possible to further improve the production value of the electric vehicle 1.

2. Modification Examples

Although some example embodiments of the technology are described above, it should be understood that example embodiments of the technology is not limited to the example embodiments described above and that various modification examples may be made in the example embodiment.

For example, the configurations, such as type, shape, arrangement, or the number of pieces, of the respective members of the electric vehicle 1 are not limited to those described in the foregoing example embodiments. An alternative example embodiment may employ type, shape, arrangement, the number of pieces, etc., other than those described with reference to the foregoing example embodiments. In addition, values, ranges, magnitude relationships, etc., of the various parameters described in the foregoing example embodiments are illustrative and non-limiting. An alternative example embodiment may employ other values, ranges, magnitude relationships, etc.

For example, although the electric vehicle 1 may include the single motor 10a in at least one example embodiment described above, this is non-limiting. Alternatively, the electric vehicle 1 may include a plurality of (two or more) motors. Further, although the electric vehicle 1 may be an EV in at least one example embodiment described above, this is non-limiting. The example embodiments of the technology may be applicable to an HEV that includes an engine and a motor as driving sources.

Although some example processes of controlling the electric vehicle 1 are described above, these are non-limiting. The electric vehicle 1 may be controlled through another method. For example, the above-described various processes of controlling the traveling of the electric vehicle 1, including the process of setting the carrier frequency, are non-limiting. For instance, although the carrier frequency fc may be changed on the basis of the revolution number Nr of the motor 10a as well as the speed ratio Rg (or the shift step Ns) in some example embodiment described above, this method is non-limiting. Alternatively, the carrier frequency fc may be changed on the basis of only the speed ratio Rg (or the shift step Ns) depending on the situation. Such a method of setting the carrier frequency is applicable not only to a case where a stepped transmission is used but also to a case where a continuously variable transmission (CVT) is used.

The series of processes described in the foregoing example embodiment may be performed by hardware (circuit) or software (program). In an example embodiment where the processes are performed by software, the software may include a group of programs that causes a computer to execute respective operations. Each program may be incorporated in the computer in advance, or may be installed in the computer via a network or a computer readable medium.

Furthermore, the various example embodiments and modification examples described above may be applied in any combination.

According to at least one example embodiment of the technology, it is possible to provide a vehicle control apparatus that improves the production value of an electric vehicle.

The example effects described above are merely illustrative and non-limiting. Any example embodiment may achieve an effect other than the example effects described above. It should be appreciated that the example embodiments of the technology described above are not intended to limit the scope of the technology. It should be also appreciated that various omissions, replacements, and modifications may be made in the foregoing example embodiments described herein, without departing from the scope of the technology. The technology is intended to include such modifications and alterations in so far as they fall within the scope of the appended claims or the equivalents thereof.

The traveling controller 151 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the traveling controller 151. Such a medium may take many forms, including, but not limited to, any type of magnetic medium such as a hard disk, any type of optical medium such as a CD and a DVD, any type of semiconductor memory (i.e., semiconductor circuit) such as a volatile memory and a nonvolatile memory. The volatile memory may include a DRAM and a SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the traveling controller 151 illustrated in FIG. 1.

The invention claimed is:

1. An electric vehicle comprising:
a motor,
a rotation angle sensor coupled to the motor, the rotation angle sensor being configured to detect a rotation angle of the motor,
a shift lever configured to be operated by a driver of the electric vehicle for selecting a shift step from steps including a first step and a second step, and
a traveling controller configured to drive the motor on a basis of a carrier frequency to control a driving force of the electric vehicle and to cause the electric vehicle to travel,
wherein the traveling controller is configured to:
convert the rotation angle of the motor into a revolution number of the motor;
while the shift step is in the first step, increase the carrier frequency as the revolution number of the motor increases;
when i) the revolution number of the motor meets a first synchronization number and ii) the shift step increases from the first step to the second step, decrease the carrier frequency; and
while the shift step is in the second step, increase the carrier frequency as the revolution number of the motor increases.

2. The vehicle control apparatus according to claim 1, wherein
the shift lever is configured to allow the driver of the electric vehicle to select i) a range corresponding to a manual mode or ii) a range corresponding to an automatic mode, and the traveling controller is configured to
when the range corresponding to the manual mode is selected using the shift lever, adjust the carrier frequency according to the revolution number of the motor and the shift step, and
when the range corresponding to the automatic mode is selected using the shift lever, avoid changing the carrier frequency.

* * * * *